United States Patent Office 2,762,793
Patented Sept. 11, 1956

2,762,793

TETRAKISAZO-DYESTUFFS

Raymond Gunst, Binningen, Switzerland, assignor to Ciba Limited, Basel, Switzerland, a Swiss firm No Drawing. Application September 27, 1954,
Serial No. 458,665

Claims priority, application Switzerland October 14, 1953

5 Claims. (Cl. 260—155)

This invention provides new tetrakisazo-dyestuffs which, like, for example, the dyestuff of the formula (1)
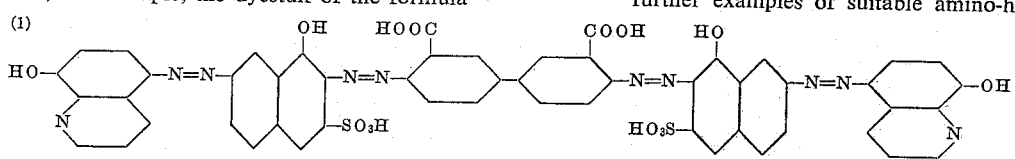

correspond to the general formula (2)
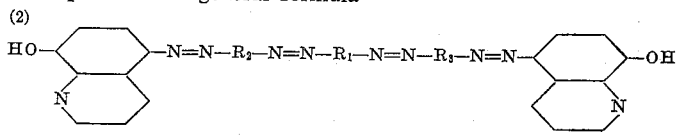

in which $R_1$ represents a diphenyl radical bound to the azo linkage in the 4- and 4'-positions and which contains in 3- and 3'-position each an —O—alkyl—COOH group of low molecular weight or a —COOH group, and $R_2$ and $R_3$ represent the radical of hydroxynaphthalene sulfonic acids bound to the —N=N—$R_1$ group in a position vicinal to the hydroxyl group and which each contain a single sulfonic acid group bound to the naphthalene nucleus.

This invention also provides a process for making the aforesaid tetrakisazo-dyestuffs, wherein a tetrazo-compound of a diamino-disazo-dyestuff of the formula (3)        $R_2$—N=N—$R_1$—N=N—$R_3$ in which $R_1$ represents a diphenyl radical bound to the azo linkage in the 4- and 4'-position and which contains in 3- and 3'-position each an —O—alkyl—COOH group of low molecular weight or a carboxylic acid group, and $R_2$ and $R_3$ represent the radical of amino-hydroxynaphthalene sulfonic acids bound to the azo linkages in a position vicinal to the hydroxyl group and which each contain a single sulfonic acid group bound to the naphthalene radical, is coupled on both sides with 8-hydroxyquinoline.

The disazo-dyestuffs of the Formula 3 are obtained by coupling on both sides a tetrazotized 4:4'-diamino-diphenyl compound substituted in the 3- and 3'-positions by —O—alkyl—COOH groups of low molecular weight or —COOH groups with amino-hydroxynaphthalene sulfonic acids of the kind defined above, it usually being of advantage to couple the tetrazo-compound on both sides with the same amino-hydroxynaphthalene sulfonic acid or at least with similar amino-hydroxynaphthalene sulfonic acids. As diamines there come into consideration, for example, 3:3'-di-(carboxymethoxy)-4:4'-diaminodiphenyl or 4:4'-diaminodiphenyl-3:3'-dicarboxylic acid.

The amino-hydroxynaphthalene sulfonic acids must of course contain a diazotizable, that is to say, a primary amino group. This amino group may either be bound directly to the naphthalene nucleus or it may be present in the form of a so-called external amino group, which is bound to the naphthalene nucleus by a suitable bridge member, for example, an —NH-aryl radical or a hetero ring fused on to the naphthalene ring. These coupling components contain a single sulfonic acid group bound directly to the naphthalene nucleus, but they may also contain so-called external sulfonic acid groups which may be present, for example, in the —NH-aryl radical referred to above. As an example of such a coupling component there may be mentioned 2-(4'-aminophenyl-amino)-5-hydroxynaphthalene-7:3'-disulfonic acid. As further examples of suitable amino-hydroxynaphthalene sulfonic acids there may be mentioned 1-amino-5-hydroxynaphthalene-7-sulfonic acid and the compound of the formula

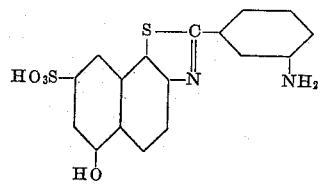

Especially valuable tetrakisazo-dyestuffs are obtained in the present process by using as starting materials tetrazotized diamino-disazo-dyestuffs of the formula (4)
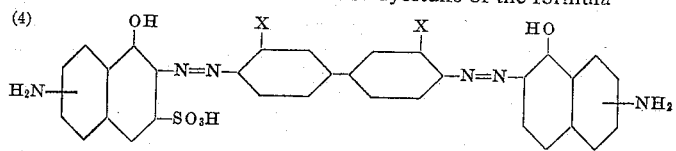

in which X represents an —O—$CH_2$—COOH group or a —COOH group and the —$NH_2$ groups are bound in $\beta$-positions to the naphthalene nuclei. These starting materials are obtained by coupling tetrazotized 3:3'-di-(carboxymethoxy)-4:4'-di-aminodiphenyl or tetrazotized 4:4'-diaminodiphenyl-3:3'-dicarboxylic acid on both sides with 2-amino-5-hydroxynaphthalene-7-sulfonic acid or 2-amino-8-hydroxynaphthalene-6-sulfonic acid or with a mixture of these two components.

In order to obtain a unitary coupling in a position vicinal to the hydroxyl group of the amino hydroxynaphthalene sulfonic acids these coupling components must usually be coupled with the tetrazotized diaminodiphenyl compounds in an alkaline medium, for example, a medium rendered alkaline with an alkali metal carbonate. Moreover, it is of advantage to run a solution of the tetrazo-compound slowly into the alkaline solution of the coupling component. This procedure is especially advantageous for making the diaminodisazo-dyestuffs of the Formula 4.

The diaminodisazo-dyestuffs of the Formula 3 are advantageously tetrazotized by the so-called indirect method by mixing, for example, a solution which contains the diamino-disazo-dyestuff in the form of an alkali salt and advantageously containing a small excess of free alkali and also the necessary quantity of alkali metal nitrite, with an excess of dilute hydrochloric acid.

The coupling of the tetrazo-disazo-compound with 8-hydroxyquinoline is advantageously carried out in an alkaline medium, for example, a medium rendered alkaline with an alkali bicarbonate or alkali carbonate, if desired, with the addition of a substance capable of assisting the coupling, such as pyridine or alcohol. It is also generally of advantage to couple the 8-hydroxyquinoline in a finely divided state, for example, by precipitating it from a solution in hydrochloric acid by means of an alkali before or after mixing it with the tetrazo-disazo-compound.

The new tetrakisazo-dyestuffs correspond to the above Formula 2 and are suitable for dyeing a very wide variety of materials, for example, materials of animal origin such as wool, silk, or leather, but especially for dyeing or printing cellulose-containing materials such as cotton, linen and staple fibers of regenerated cellulose. The dyestuffs may be converted into complex metal compounds in substance, in the dyebath or on the fiber. The treatment with an agent yielding metal, for example an agent yielding copper, is advantageously carried out on the fiber or partially on the fiber and partially in the dyebath. If desired, there may be used the process of U. S. Patent 2,148,659 in which there are carried out in the same bath first the dyeing, and after the dyestuff has been practically completely absorbed, the treatment with the agent yielding metal. As agents yielding metal for the latter process there come into consideration those which are stable towards alkaline solutions, such as complex copper tartrates.

In some cases valuable dyeings can also be obtained by using the process in which a dyeing or print produced with the metal-free dyestuff is after-treated with an aqueous solution which contains a basic formaldehyde condensation product from a compound which contains at least once the atomic grouping

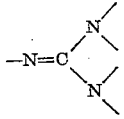

or of a substance, for example cyanamide, which can easily be converted into such a compound, and which solution also contains a water-soluble, and especially a complex, copper compound. Such a process is described, for example, in British Patent No. 619,969.

The coppered dyeings obtainable in the manner described above with the new tetrakisazo-dyestuffs are distinguished by their very good fastness to light and washing.

The following examples illustrate the invention, the parts being by weight unless otherwise stated and the relationship of parts by weight to parts by volume being the same as that of the kilogram to the liter:

*Example 1*

27.2 parts of 4:4′-diaminodiphenyl-3:3′-dicarboxylic acid are tetrazotized in known manner. The tetrazo-compound is coupled by slowly introducing it dropwise at room temperature into a solution rendered alkaline with sodium carbonate of 51.2 parts of 2-amino-5-hydroxynaphthalene-7-sulfonic acid. The symmetrical disazo-dyestuff is precipitated by the addition of sodium chloride, filtered off and washed with a dilute solution of sodium chloride.

The disazo-dyestuff is then dissolved in 1000 parts of water at 80° C., 14.5 parts of sodium nitrite are added in the form of a 2N-solution, and the mixture is run at 0–5° C. into a solution of 60 parts by volume of hydrochloric acid of 30 per cent strength in 300 parts of water. By the addition of ice the temperature is maintained at 0–5° C. throughout. After stirring the mixture for several hours, the sparingly soluble tetrazo-compound is filtered off and again suspended in water. For the purpose of coupling, a solution of 29 parts of 8-hydroxyquinoline dissolved in 300 parts of water in the form of its semi-sulfate by the addition of sulfuric acid is added to the suspension of the tetrazo-compound, and by gradually throwing in sodium bicarbonate the coupling mixture is rendered weakly alkaline. The tetrakisazo-dyestuff precipitates in the form of a black precipitate. When dry it is a black powder having a bronze lustre, which dissolves in water with a blue coloration and dyes cellulose fibers by the single bath or 2-bath after-coppering process navy blue tints which are fast to washing and light.

By using for the first coupling, instead of 51.2 parts of 2 - amino - 5 - hydroxynaphthalene - 7′ - sulphonic acid, 83 parts of 2 - (4′ - aminophenylamino) - 5 - hydroxynaphthalene-7:3′-disulfonic acid and otherwise proceeding in the manner described in this example, a very similar dyestuff is obtained.

*Example 2*

27.2 parts of 4:4′-diaminodiphenyl - 3:3′ - dicarboxylic acid are tetrazotized in the usual manner and coupled with 51.2 parts of 2-amino-8-hydroxynaphthalene - 6 - sulfonic acid in a manner analogous to that described in Example 1. The further procedure is as described in Example 1, that is to say, the isolated disazo-dyestuff is further tetrazotized and the tetrazo-compound, after being isolated, is coupled with 8-hydroxyquinoline. When dry the resulting tetrakisazo-dyestuff is a black powder having a bronze lustre, which dissolves in water with a dark grey-blue coloration and dyes cellulose fibers by the single bath or 2-bath after-coppering process grey to black tints which are fast to washing and light.

By using for the first coupling, instead of 51.2 parts of 2 - amino - 8 - hydroxynaphthalene - 6 - sulfonic acid, a mixture of 25.6 parts each of 2 - amino - 8 - hydroxynaphthalene-6-sulfonic acid and 2-amino-5-hydroxynaphthalene-7-sulfonic acid and otherwise proceeding as described in Example 1, there is obtained a dyestuff having very similar properties which dyes cellulose fibers by the after-coppering process dull navy blue tints.

*Example 3*

33.2 parts of 4:4′ - diaminodiphenyl - 3:3′ - diglycollic acid (3:3′ - di - (carboxymethoxy) - 4:4′ - diaminodiphenyl of the formula

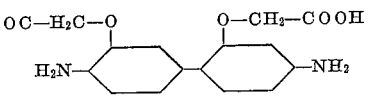

are dissolved in the form of the sodium salt and tetrazotized in known manner by the so-called indirect method. The tetrazo-compound is coupled by slowly introducing it dropwise at room temperature into a solution rendered alkaline with sodium carbonate of 51.2 parts of 2 - amino - 5 - hydroxynaphthalene - 7 - sulfonic acid. The symmetrical disazo-dyestuff is precipitated by the addition of sodium chloride, filtered off and washed with a dilute solution of sodium chloride.

The disazo-dyestuff is then dissolved in 1000 parts of water at 80° C., 14.5 parts of sodium nitrite are added in the form of a 2 N-solution, and the mixture is run at 0–5° C. into a solution of 60 parts by volume of hydrochloric acid of 30 per cent strength in 300 parts of water. By the addition of ice the temperature is maintained at 0–5° C. throughout. After stirring the mixture for several hours, the sparingly soluble tetrazo-compound is filtered off and again suspended in water. For the purpose of coupling a solution of 29 parts of 8-hydroxyquinoline dissolved in 300 parts of water in the form of its semi-sulfate by the addition of sulfuric acid is added to the suspension of the tetrazo-compound, and by slowly throwing in sodium bicarbonate the coupling mixture is rendered weakly alkaline. The tetrakisazo-dyestuff precipitates in the form of a black precipitate. When dry it is a black powder with a bronze lustre, which dissolves in water with a blue coloration and dyes cellulose fibers by the single bath or 2-bath after-coppering process navy blue tints which are fast to light and washing.

Further dyestuffs having similar properties are obtained by using in this example, instead of 2-amino-5-hydroxy-naphthalene-7-sulfonic acid, another amino-hydroxynaphthalene sulfonic acid or a mixture of such sulfonic acids. Thus, there is obtained with 2-amino-8-hydroxynaphthalene-6-sulfonic acid a dyestuff which dyes cellulose fibers by the after-coppering dyeing process greenish black tints having an excellent fastness to light.

*Example 4*

100 parts of cotton are entered at 50° C. into a dyebath which contains in 4000 parts of water 3 parts of the tetrakisazo-dyestuff obtained as described in the first and second paragraphs of Example 1, and 2 parts of anhydrous sodium carbonate. The temperature is raised to 90–95° C. in the course of 20 minutes, 40 parts of crystalline sodium sulfate are added, and dyeing is continued for 30 minutes at 90–100° C. The bath is then allowed to cool to about 70° C., 2 parts of complex sodium copper tartrate of approximately neutral reaction are then added, coppering is carried on for ½ hour at about 80° C., and the dyeing is rinsed with cold water. If desired, the dyeing may be soaped by after-treatment with a solution which contains 5 parts of soap and 2 parts of anhydrous sodium carbonate in 1000 parts by volume of water. There is obtained a navy blue dyeing of good fastness to washing and light.

What is claimed is:

1. A tetrakisazo-dyestuff of the formula

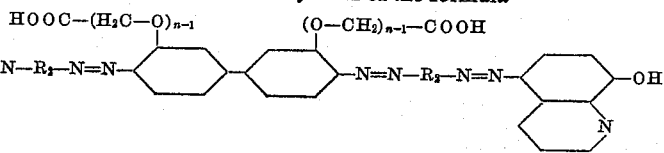

in which $R_2$ represents the radical of a hydroxynaphthalene sulfonic acid bound to the —N=N-diphenyl radical in a position vicinal to the hydroxyl group and containing a single sulfonic acid group bound to the naphthalene nucleus, and $n$ represents a whole number of at the most 2.

2. A tetrakisazo-dyestuff of the formula

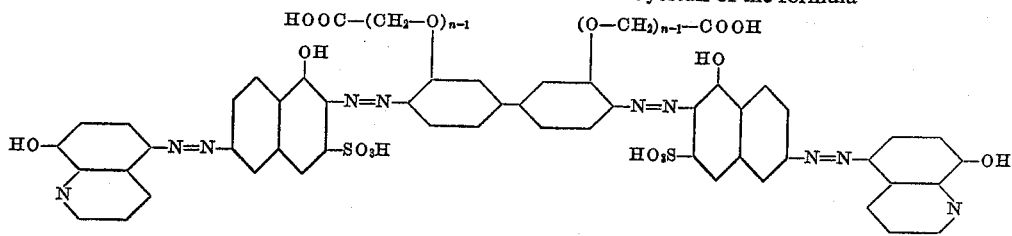

in which $n$ represents a whole number of at the most 2 and all the azo linkages are bound in $\beta$-positions to the naphthalene nuclei.

3. The tetrakisazo-dyestuff of the formula

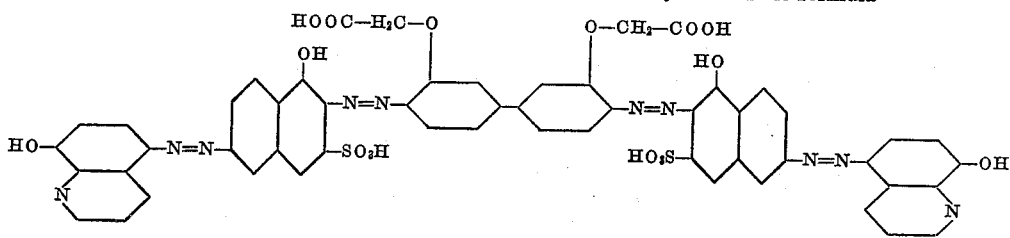

4. The tetrakisazo-dyestuff of the formula

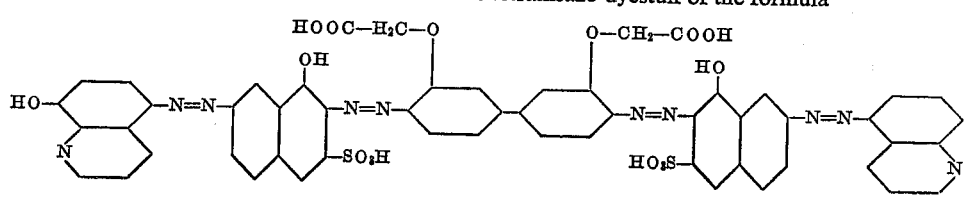

5. The tetrakisazo-dyestuff of the formula

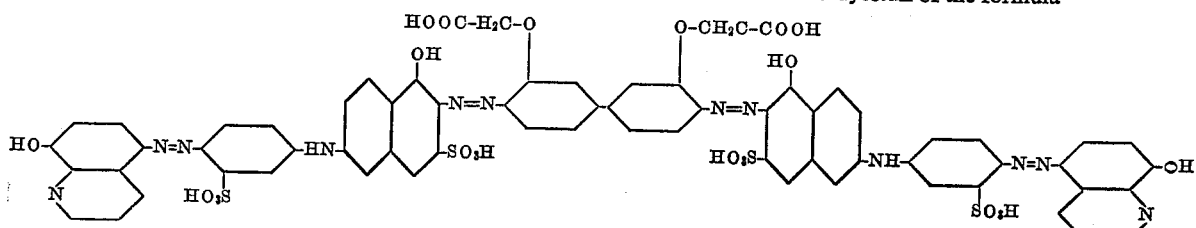

References Cited in the file of this patent
UNITED STATES PATENTS

| | | |
|---|---|---|
| 1,879,240 | Hilger et al. | Sept. 27, 1932 |
| 2,283,294 | Straub et al. | May 19, 1942 |
| 2,507,754 | Bossard et al. | May 16, 1950 |